(12) United States Patent
Hayashi et al.

(10) Patent No.: US 6,942,555 B2
(45) Date of Patent: Sep. 13, 2005

(54) GEAR-SHAPING GRINDSTONE AND METHOD OF FABRICATING THE SAME

(75) Inventors: Toshiya Hayashi, Yokkaichi (JP); Hisatoshi Kojima, Okazaki (JP); Kazuki Kataoka, Yokohama (JP); Toru Nakanoboh, Mie (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/347,994

(22) Filed: Jan. 20, 2003

(65) Prior Publication Data

US 2003/0143932 A1 Jul. 31, 2003

(30) Foreign Application Priority Data

Jan. 21, 2002 (JP) ........................................ 2002-011929

(51) Int. Cl.⁷ .............................................. B24B 17/00
(52) U.S. Cl. ........................ 451/253; 451/456; 451/451; 451/900; 51/309
(58) Field of Search .................................. 451/178, 541, 451/546, 547, 548, 900, 219, 253; 51/295, 298, 309

(56) References Cited

U.S. PATENT DOCUMENTS 5,891,206 A * 4/1999 Ellingson ..................... 51/309
6,196,911 B1 * 3/2001 Preston et al. .............. 451/548
6,358,133 B1 * 3/2002 Cesena et al. .............. 451/450

FOREIGN PATENT DOCUMENTS

| JP | 63134113 | * | 6/1988 | .................. 451/540 |
| JP | 63150165 | * | 6/1988 | .................. 51/295 |
| JP | 4-210322 |   | 7/1992 |  |
| JP | 04210322 | * | 7/1992 |  |

* cited by examiner

*Primary Examiner*—Eileen P. Morgan
(74) *Attorney, Agent, or Firm*—Harness, Dickey & Pierce, PLC

(57) ABSTRACT

A highly accurate, long-life grindstone for shaping a gear and a method of fabricating the grindstone, without depending on the accuracy of form of a base metal and without using a special grinding machine or a special lapping machine, are disclosed. A super-abrasive layer (29) of a predetermined thickness is fixedly attached on the outer periphery of a body portion (24) of the base metal (23) formed in a cylinder solid. The super-abrasive layer (29) is metal-bonded, and has the outer periphery thereof formed with a toothed portion (31) in the shape of the teeth of an external gear by electric discharge machining.

14 Claims, 1 Drawing Sheet

GEAR-SHAPING GRINDSTONE AND METHOD OF FABRICATING THE SAME

BACKGROUND OF THE INVENTION

1. Field of the Invention

The present invention relates to a gear-shaping grindstone which is rotated in mesh with a gear to be ground, thereby to grind and finish the tooth flank, and to a method of fabricating the grindstone.

2. Description of the Related Art

The transmission gear of automobiles and other gears are conventionally ground to high accuracy to reduce noise. A method of grinding these gears consists in rotating a gear-shaped grindstone in mesh with a gear to be ground (hereinafter referred to as the work gear) and grinding the tooth flank of the work gear.

An example of such a grindstone is disclosed in Japanese Unexamined Patent Publication No. 7-108484. The grindstone disclosed in this publication is so configured that a grinding face is formed by fixedly attaching a single layer of a super-abrasive to the toothed portion of a base metal by electrodeposition and an adjustable grinding portion is formed at a predetermined portion on the top land side of the tooth flank by grinding or lapping.

As described in the publication cited above, the conventional grindstone of the above-mentioned type is generally fabricated by fixedly attaching the super-abrasive to the base metal by electrodeposition. In forming a super-abrasive layer by electrodeposition, however, the accuracy of form of the grindstone is dependent on that of the base metal. In order to improve the accuracy of form of the grindstone, the super-abrasive layer is required to be ground or lapped, which in turn requires a special grinding machine or a special lapping machine capable of shaping the teeth.

Also, in view of the fact that the distribution, size, direction and the interval of the super-abrasives of the super-abrasive layer formed by electrodeposition are uncontrollable, the super-abrasive layer is formed unevenly on the tooth flank. As a result, the roughness of the tooth flank of the work gear ground with such a super-abrasive layer is not very satisfactory for a deteriorated accuracy of form.

Further, the electrodeposition is generally used to form a single layer of super-abrasive. Once the grindstone is used until the grinding efficiency is reduced, therefore, it is not an easy matter to restore the particular grindstone into a usable state. Specifically, the entire super-abrasive layer must be removed from the base metal and a new super-abrasive layer formed by electrodeposition again. This job is very bothersome.

SUMMARY OF THE INVENTION

This invention has been achieved to solve the above-mentioned problem, and the object thereof is to provide a grindstone having a high accuracy of form of the teeth for shaping a gear and a method of fabricating such a grindstone regardless of the accuracy of form of the base metal of the grindstone or without using a special grinding machine or a special lapping machine.

Another object of the invention is to provide a grindstone for shaping a gear, which can be used repeatedly by machining the surface of the super-abrasive layer.

In order to achieve the above-mentioned objects, according to one aspect of this invention, there is provided a gear-shaped grindstone, for shaping a gear, in which a metal-bonded super-abrasive layer is formed on at least the outer layer portion of the toothed portion.

According to another aspect of the invention, the profile of the super-abrasive layer is formed by electric discharge machining.

According to still another aspect of this invention, there is provided a method of fabricating a grindstone for shaping a gear, in which a base metal is arranged in a predetermined die, and a metal-bond material containing the super-abrasive of a predetermined grain size is filled in the die. The resulting assembly is heated under pressure so that the super-abrasive layer is sintered integrally with the base metal. After that, the profile of the toothed portion is formed by electric discharge machining.

BRIEF DESCRIPTION OF THE DRAWINGS

FIGS. 1a and 1b are diagrams showing a grindstone in the shape of an internal gear according to a first embodiment of the invention, in which FIG. 1a is a front view and FIG. 1b a partly cut-away right side sectional view taken in line IB—IB in FIG. 1a.

FIGS. 2a and 2b are diagrams showing a grindstone in the shape of an external gear according to a second embodiment of the invention, in which FIG. 2a is a front view and FIG. 2b a partly cut-away right side sectional view taken in line IIB—IIB in FIG. 2a.

DESCRIPTION OF THE PREFERRED EMBODIMENTS

Embodiments of the invention will be explained in detail below with reference to the accompanying drawings. The scope of the invention, however, is not limited to the embodiments described below.

Figure 1A:
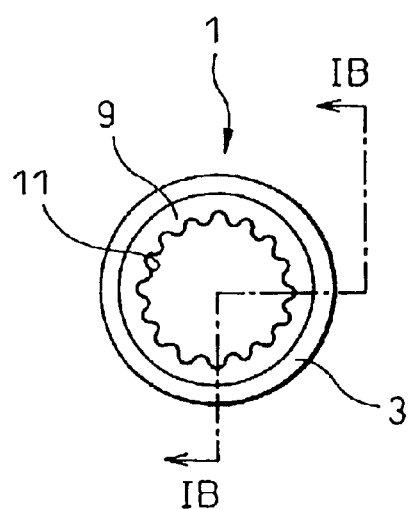
Figure 1B:
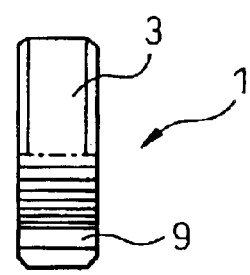

FIGS. 1a and 1b are diagrams showing a grindstone in the shape of an internal gear according to a first embodiment of the invention, in which FIG. 1a is a front view and FIG. 1b a partly cut-away right side sectional view taken in line IB—IB in FIG. 1a.

Reference numeral 3 designates a short cylindrical base metal. A cylindrical super-abrasive layer 9 having a predetermined thickness is fixedly attached on the inner periphery of the base metal 3. The super-abrasive layer 9 is metal-bonded. The inner peripheral side of the super-abrasive layer 9 is formed into a toothed portion 11 in the shape of the teeth of the internal gear. A method of fabricating this grindstone will be described later.

The base metal 3 is not necessarily cylindrical in shape. Especially, the inner peripheral surface of the base metal 3 has not necessarily a circular section but may be in the shape of an internal gear, for example. Specifically, the super-abrasive layer 9 is only required to be fixedly attached on the base metal in such a manner as to form an outer layer portion of the toothed portion 11, having at least a predetermined thickness.

Figure 2A:
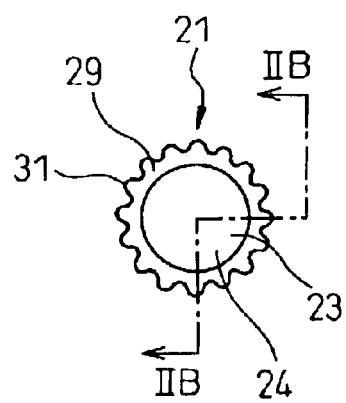
Figure 2B:
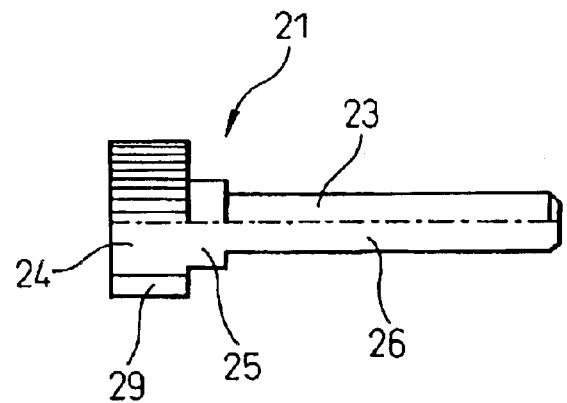

FIGS. 2a and 2b are diagrams showing a grindstone in the shape of an external gear according to a second embodiment of the invention, in which FIG. 2a is a front view and FIG. 2b a partly cut-away right side sectional view taken in line IIB—IIB in FIG. 2a.

Numeral 23 designates a short solid cylindrical base metal having a large diameter. A body portion 24 with a super-abrasive layer 29 fixedly attached on the outer periphery thereof, a shank 26 constituting a right portion having a small diameter and an intermediate portion 25 having an intermediate diameter are integrally formed on the outer periphery of the base metal 23. The super-abrasive layer 29, like the counterpart shown in FIG. 1a, is metal-bonded to a predetermined thickness, and has the outer periphery thereof making up a toothed portion 31 in the shape of an external gear. A method of fabricating this grindstone will be explained later.

The body portion 24 of the base metal 23 is not necessarily in the shape of a cylinder solid as in the first embodiment.

A method of fabricating the grindstone 1 (21) will be explained below.

First, the base metal 3 (23) is placed in a predetermined die. A super-abrasive having a predetermined grain size for forming the super-abrasive layer 9 (29), or specifically, a metal-bond material containing a predetermined percentage of diamond or cubic boron nitride (CBN) is filled in the die. The resulting assembly is sintered under pressure while at the same time fixedly attaching the metal-bond material, i.e. the super-abrasive layer 9 (29) integrally on the inner periphery (or the outer periphery) of the base metal 3 (23).

Next, the toothed portion is formed by subjecting the inner periphery (or the outer periphery) of the super-abrasive layer 9 (29) to the die sinking electric discharge machining or the wire electric discharge machining. After the electric discharge machining, a dressing process is preferably executed. Nevertheless, the wire electric discharge machining is preferably used for the super-abrasive layer 9 (29).

As described above, the super-abrasive layer 9 (29) is metal-bonded and, therefore, the gear profile can be formed by the electric discharge machining. As a result, the toothed portion 11 (31) can be machined accurately without depending on the accuracy of form of the base metal 3 (23). According to this invention, the super-abrasive layer includes a multiplicity of sublayers of a super-abrasive. In the case where the abrasive of the outermost sublayer is worn, therefore, the abrasive of the next sublayer is exposed and shaped while continuing the electric discharge machining. The super-abrasive layer can thus be reused.

The gear-shaping grindstone having the configuration shown in FIGS. 1 and 2 was fabricated under the conditions described below and used for grinding the work gear.

In a first embodiment, a grindstone of SD600N150M (JIS B 4131) was fabricated in the manner described above, using a metal-bond material containing a super-abrasive having a grain size of #600 (average grain size of 25 $\mu$m). The profile of the toothed portion of the grindstone fabricated in this way had an accuracy of form of ±2 $\mu$m or less and was finished very satisfactorily.

The work gear (Hrc60) of steel annealed after rough machining was finished using this grindstone. The cutting stock on each side of the work gear was 10 $\mu$m in maximum. Nevertheless, the grindstone cut sharp, and the accuracy of form of the teeth of the work gear was not more than 5 $\mu$m. The grindstone not subjected to the dressing process was blunt and the satisfactory cutting stock of 10 $\mu$m could not be secured.

According to a second embodiment of the invention, a grindstone was fabricated in the same manner as in the first embodiment, using a metal-bond material containing a super-abrasive having the grain size of #325 (average grain size of 46 $\mu$m). The accuracy of form of the profile of this grindstone exceeded ±2 $\mu$m, which was inferior to that of the first embodiment. The grindstone subjected to the dressing process cut sharp, although the accuracy of form of the profile of the work gear exceeded ±5 $\mu$m and was inferior to that of the first embodiment.

According to a third embodiment of the invention, a grindstone was fabricated by the same method as in the first embodiment using a metal-bond material containing a super-abrasive having the grain size of #800 (average grain size of 20 $\mu$m). The accuracy of form of the profile of this grindstone was very high. Nevertheless, the grindstone cut less sharp due to the excessively small grain size of the super-abrasive, resulting in the accuracy of form inferior to that of the first embodiment.

The embodiments described above show that a high accuracy and the sharpness can be obtained by the super-abrasive grain size of about #600.

The grindstone fabricated according to the embodiments was compared with one fabricated by electrodeposition. A base metal in the shape of gear was fabricated by the wire electric discharge machining and the super-abrasive having the grain size of #600 was applied by electrodeposition. The work gear formed by use of this grindstone had the accuracy of form of the profile exceeding 10 $\mu$m and could not be used as a product. This indicates that it is difficult to fabricate a grindstone of a sufficiently high accuracy of form by electrodeposition.

As described above, according to this invention, at least the outer layer portion of the toothed portion is configured of a metal-bonded super-abrasive layer, and therefore a profile very high in accuracy of form can be obtained by the electric discharge machining. As a result, a grindstone of high accuracy can be fabricated without regard to the accuracy of form of the base metal. Also, the need of a special grinding machine or a special lapping machine is eliminated.

Further, in view of the fact that the super-abrasive layer is formed to a predetermined thickness and includes a multiplicity of sublayers, the profile thereof can be geometrically repaired, thereby making the repeated use of the grindstone economic.

What is claimed is:

1. A grindstone for shaping a gear profile, the grindstone including a toothed portion, the grindstone comprising:
    a base metal having an inner surface and an outer surface;
    a metal bonded super abrasive layer made of metal bond material and an abrasive, the metal bonded super abrasive layer being integrally formed on one of the inner surface and the outer surface of the base metal, and having a predetermined thickness in a radial direction, wherein
    the toothed portion having a profile corresponding to that of the gear profile is formed on the metal bonded super abrasive layer by electric discharge machining, and
    the one surface on which the metal bonded super abrasive layer is integrally formed has a profile different from the profile of the toothed portion so that the metal bonded super abrasive layer is formed in the predetermined thickness that enables the metal bonded super abrasive layer to be machined into the profile of the toothed portion by the electric discharge machining.

2. A grindstone for shaping a gear profile according to claim 1, wherein said super abrasive layer comprises diamonds.

3. A grindstone for shaping a gear profile according to claim 1, wherein said electric discharge machining comprises die sinking electric discharge machining.

4. A grindstone for shaping a gear profile according to claim 1, wherein said super-abrasive layer is formed of a multiplicity of super-abrasive sublayers.

5. A grindstone for shaping a gear profile according to claim 1, wherein said super abrasive layer comprises cubic boron nitride.

6. A grindstone for shaping a gear profile according to claim 1, wherein said electric discharge machining comprises wire electric discharge machining.

7. The grindstone according to claim 1, wherein the surface on which the metal bonded super layer is integrally formed is a cylindrical surface.

8. A method of fabricating a grindstone for shaping a gear profile, the grindstone includes a toothed portion having an outer layer portion, wherein at least the outer layer portion of the toothed portion is configured of a super-abrasive layer, said method comprising steps of:

preparing a base metal having an inner surface and an outer surface;

fixedly attaching and integrally forming a metal bonded super abrasive layer made of a metal-bond material and an abrasive on one of the inner surface and the outer surface of the base metal, the metal bonded super abrasive layer making up at least the outer layer portion of said toothed portion, the metal bonded super abrasive layer being formed with a predetermined thickness in a radial direction; and forming a profile of said outer layer portion corresponding to that of the gear profile by electric discharge machining, wherein the one surface on which the metal bonded super abrasive layer is integrally formed has a profile different from the profile of the toothed portion so that the metal bonded super abrasive layer is formed in the predetermined thickness that enables the metal bonded super abrasive layer to be machined into the profile of the toothed portion by the electric discharge machining.

9. A method of fabricating a grindstone for shaping a gear profile according to claim 8, further comprising the step of dressing said grindstone after said electric discharge machining.

10. The grindstone according to claim 8, wherein the surface on which the metal bonded super layer is integrally formed is a cylindrical surface.

11. A grindstone for shaping a gear profile, the grindstone comprising:

a base metal having a bonding surface;

a metal bonded super abrasive layer bonded to the bonding surface of the base metal, the metal bonded super abrasive layer being comprised of metal bond material and abrasive; wherein the metal bonded super abrasive layer defines a toothed portion having a plurality of teeth having top lands and bottom lands, said toothed portion having a profile corresponding to that of the gear profile and formed by electrical discharge machining;

the metal bonded super abrasive layer defines a specified thickness extending from the base metal to an exposed surface of the metal bonded super abrasive layer; and a distance between the bottom lands and the top lands of the plurality of teeth is less than the specified thickness.

12. The grindstone according to claim 11, wherein the bonding surface is a cylindrical surface.

13. A method of fabricating a grindstone for shaping a gear profile, the method comprising:

preparing a base metal having a bonding surface;

bonding a metal bonded super abrasive layer made of a metal bond material and an abrasive on the bonding surface of the base metal, the metal bonded super abrasive layer having a specified thickness;

forming a plurality of teeth having top lands and bottom lands entirely out of the metal bonded super abrasive layer by electric discharge machining; a distance between the bottom lands and the top lands being less than the specified thickness.

14. The grindstone according to claim 13, wherein the bonding surface is a cylindrical surface.

* * * * *